INVENTOR
WILLIAM F. HUCK

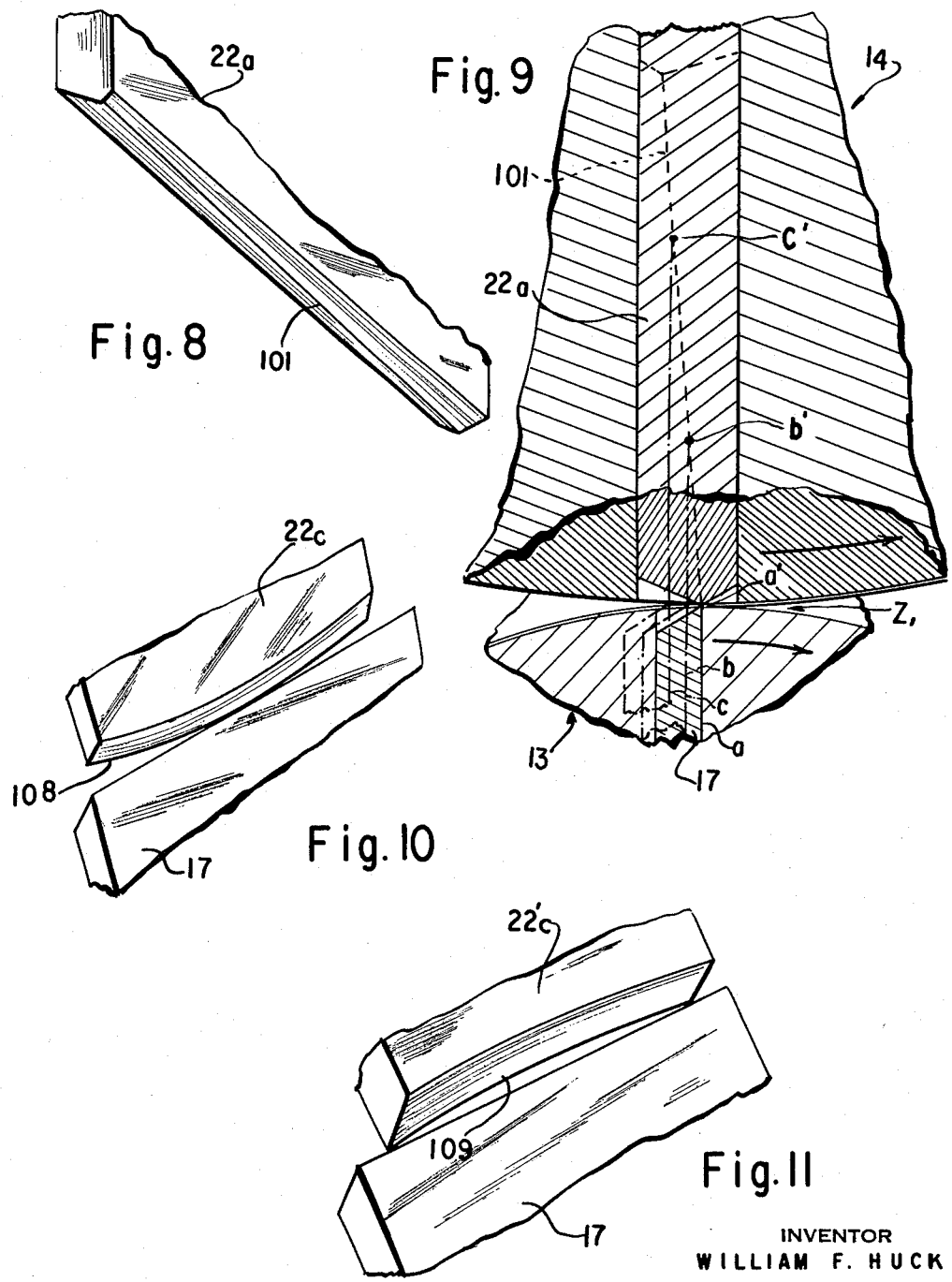

United States Patent Office

3,174,372
Patented Mar. 23, 1965

3,174,372
HIGH SPEED WEB CUTTING AND DELIVERY MACHINE
William F. Huck, 81 Greenway Terrace,
Forest Hills, N.Y.
Filed Mar. 19, 1962, Ser. No. 180,585
13 Claims. (Cl. 83—110)

This invention relates generally to machines for cutting a continuous web of flexible material, such as paper, cardboard, cloth, plastic, foil or the like, into separated sections, such as separate sheets, and for delivering the severed sections for further processing.

Machines actually employed heretofore for the above described purpose generally use some form of reciprocatory shear cutting mechanism to produce separate sheets from the continuous web. In such existing machines, the web is passed over a stationary knife, and a reciprocating shear knife cooperates with the stationary knife to shear cut the web into repetitively uniform sections constituting the separated sheets. It is apparent that, during the shear cutting action, the forward motion of the web has to be interrupted for a period of time depending upon the shear angle of the knives and the speed of movement of the reciprocating knife. Although the existing machines can achieve adequate accuracy in producing sheets which are of uniform size, the fact that the movement of the web must be interrupted during each cutting action constitutes a serious disadvantage, particularly when previous processing of the web, for example, the repetitive printing thereof, takes place with the web moving at a constant speed. The speed at which a web fed continuously to a sheeting machine employing a reciprocatory shear cutting action may be cut into sheets by the latter is limited by reason of the difficulties encountered in maintaining the uniform tension in the web necessary for ensuring accuracy of the length of the sheets cut therefrom during the intermittent movement of the web over the stationary knife, and in effecting the rapid acceleration of the leading end of the web following the cutting action. Further, it is not mechanically possible to greatly increase the speed of the reciprocatory motion of the moving knife, because of the prohibitively high accelerations and inertia forces that are then encountered. It has also been found that the cut edge of the web tends to stick or adhere to the stationary knife, and this further impedes attempts to increase the operating speeds of the above described existing machines.

Although attempts have been made to produce sheeting machines employing rotary cutters with a view to avoiding the intermittent movement of the web required by a reciprocatory shear cutting action, such proposed machines have been incapable of maintaining the desired accuracy of the sizes of the sheets cut from the web, particularly when operated at high speeds, and further are not capable of reliably delivering the successive sheets during high speed operation.

Accordingly, it is an object of this invention to provide a web cutting and delivery machine which achieves the desired accuracy and quality of cutting of repetitive sections from a continuously moving web, and will do so at the highest web speeds now considered practical, for example as in modern printing presses.

More specifically, it is an object of the invention to provide a machine employing rotary cutting means so as to avoid the needs for intermittently moving the web and for reciprocating the cutting knife, which have restricted the operating speeds of the sheeting machines previously in use, and wherein the web is handled, during the cutting thereof, in a manner to ensure that the desired uniform size of the successive sections cut therefrom is accurately maintained even during very high speed operation.

Another object is to provide a high speed web cutting machine of the described character with improved mechanism for uniformly maintaining a predetermined tension in the web fed thereto, thereby to permit the desired accurate maintenance of uniform sizes of the cut web sections, even though the web is subjected to changing environment or atmospheric conditions or to the corrective action of suitable apparatus for effecting registration of areas of the web, for example, preprinted patterns thereon, with respect to the locations along the web at which the latter is cut into successive sections.

Still another object is to provide a rotary web cutting machine of the described character with improved means for reliably carrying away or delivering the successive sections cut from the web at the desired high operating speeds.

In accordance with an aspect of this invention, a high speed web cutting machine includes a first rotated cylinder carrying one or more axially extending knives, with the web being wrapped about a portion of the periphery of the knife-carrying cylinder so that the web is moved positively with the surface of the latter, and a second cylinder rotated counter to the knife-carrying cylinder and carrying one or more anvil members each coacting with a knife of the first cylinder at a zone of tangency of the two cylinders to repetitively cut the continuously moving web into successive sections or sheets which are carried from that zone on the second cylinder.

In a preferred embodiment of the invention, the web is held tightly against the portion of the periphery of the knife-carrying cylinder around which the web is wrapped so as to ensure the non-slip relation of the web to the surface of the knife-carrying cylinder, and this function may be performed by an endless flexible belt having a flight wrapped arcuately over the web on the knife-carrying cylinder and being biased against the latter so as to move with the web while pressing the latter against the surface of the knife-carrying cylinder.

In accordance with a feature of the invention, the uniform tension in the web necessary for accurate cutting thereof into sections is maintained by a web tension control incorporated in the knife-carrying cylinder of the rotary cutting means and which includes surface-forming bar elements movable at least radially on the knife-carrying cylinder, and an adjustably biased floating roller system engaged by the web in advance of the rotary cutting means so as to be displaced in response to changes in the web tension from an adjustably predetermined value. The floating roller system is connected through an actuating mechanism to the surface-forming bar elements of the knife-carrying cylinder for displacing the bar elements upon displacement of the floating roller system so as to either increase or decrease the effective circumference of the knife-carrying cylinder, and hence the length of the web wrapped around the latter, upon either a decrease or increase, respectively, of the web tension from the predetermined value thereof.

In a preferred web tension control, the surface-forming bar elements of the knife-carrying cylinder are mounted on the latter by means of inclined springs so as to be movable radially in response to axial displacement thereof by the actuating mechanism, and such springs provide a force which balances the resultant of the web tension and of an adjustable tension control force acting on the floating roller system, and hence through the actuating mechanism, on the bar elements. Further, in the preferred web tension control, the surface-forming bar elements are of T-shaped cross-section so as to define a large proportion of the surface area of the knife-carrying cylinder.

In accordance with still another aspect of this invention, the successive sheets cut from the web at the zone of tangency of the knife-carrying or first cylinder and second cylinder of the rotary cutting means and carried away from such zone on the surface of the second cylinder, are removed from the latter at a forward transfer zone. In a particularly advantageous embodiment of the invention, the second cylinder is rotated counter to the knife-carrying cylinder at the same angular speed as the latter, but has a greater circumference than the knife carrying cylinder so that its peripheral speed is proportionately greater, and the second cylinder is provided with means operative to hold to its surface the leading part of the web moved by the knife-carrying cylinder into the zone of tangency of the two cylinders, so that such leading part of the web will be carried away from that zone on the surface of the second cylinder, and yet permitting slipping of the surface of the second cylinder relative to the leading part of the web until the latter is severed from the succeeding portion of the web by the cutting action at said zone of tangency, so that each section formed from the web is carried away from the zone of tangency of the two cylinders in spaced relation to the succeeding section.

In a preferred embodiment for producing single-ply sheets from a single-ply web, the leading part of the web is held to the surface of the second cylinder by providing the latter with ports in its surface and with means for applying suction to the ports so that the leading part of the web covering the ports is held slidably to the surface of the second cylinder until a sheet is formed therefrom and then the formed sheet is carried forward on the surface of the second cylinder at the peripheral speed of the latter.

Further, in order to permit reliable high speed delivery of the sections cut successively from the web, the second cylinder of the rotary cutting means has recesses formed in the surface of the latter each at a location occupied by the leading edge of a section formed by severing the latter from the remainder of the web, and there is further provided a delivery conveyor carrying grippers which are moved in synchronism with the second cylinder and positioned relative to the latter at a forward transfer zone so as to intercept a recess or series of aligned recesses of the second cylinder at the transfer zone and there grip the leading edge of a cut section overlying the related recess, whereupon the section is stripped from the second cylinder by the delivery conveyor.

In a preferred arrangement of the delivery system, for use in the delivery of successively cut single-ply sheets, the peripheral speed of the delivery conveyor is less than that of the second cylinder of the rotary cutting means so that the second cylinder moves the leading edge of each sheet carried thereby into secure engagement with the grippers intercepting its related recess at the transfer zone, and the second cylinder further has suction ports in its surface disposed to hold the trailing part of each sheet thereto beyond the transfer zone so that the trailing part of each sheet being carried away by the delivery conveyor is moved away from the transfer zone and thereby avoids interference with the leading edge of the succeeding sheet then approaching the transfer zone.

The above, and other objects, features and advantages of the invention, will be apparent in the following detailed description of illustrative embodiments thereof, which is to be read in connection with the accompanying drawings forming a part hereof, wherein:

FIG. 8 is a fragmentary perspective view of the cutting edge of one of the cutting elements included in the modified arrangement of FIG. 7;

FIG. 9 is a diagrammatic view illustrating the manner in which the arrangement of FIG. 7 is effective to achieve a shear cutting action; and FIGS. 10 and 11 are fragmentary perspective views illustrating two other modifications of cutting elements effective to achieve a shear cutting action according to the invention.

Figure 1:
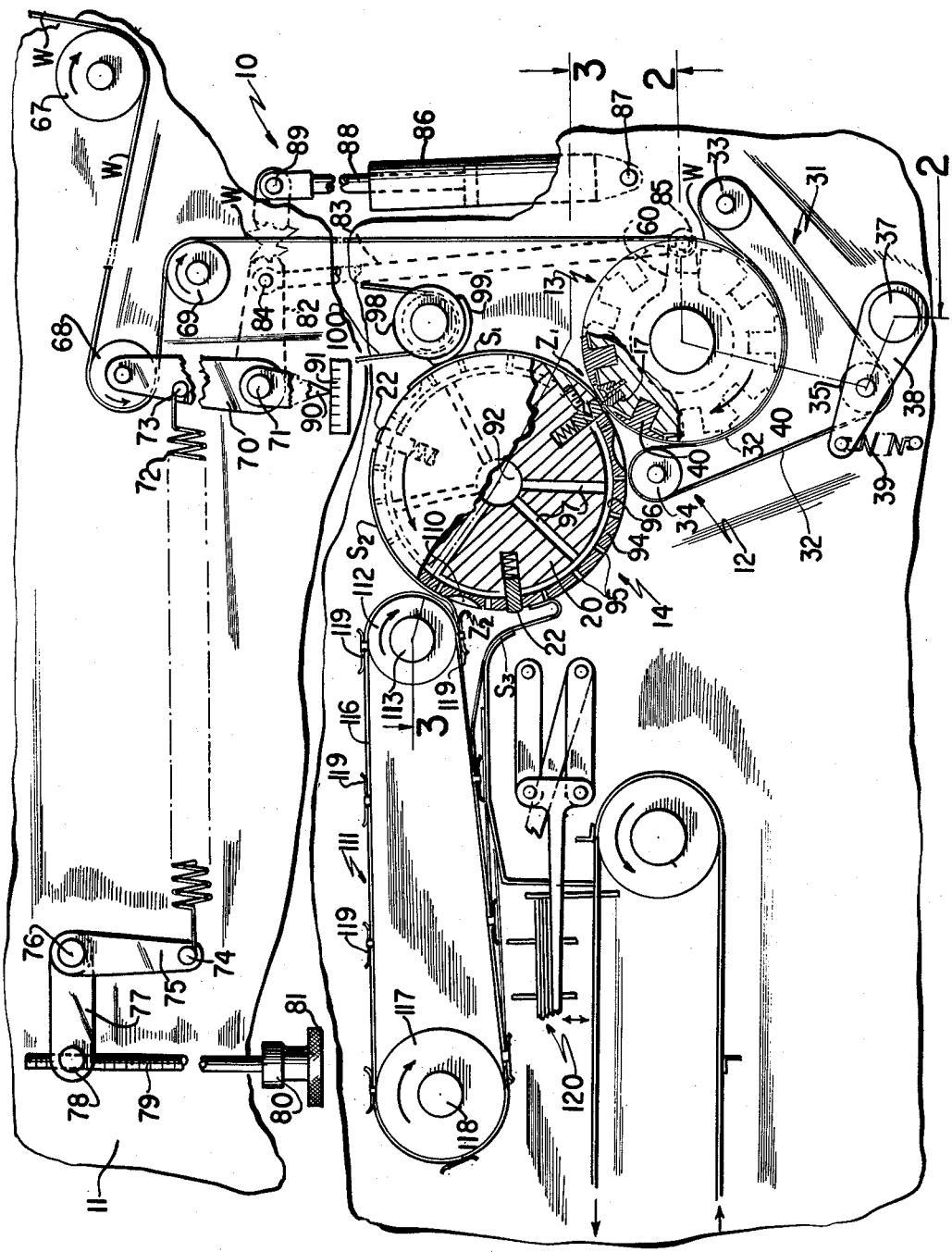
FIG. 1 is a side elevational view, partly broken away and in section, of a high-speed web sheeting and sheet delivery machine embodying the invention.

Referring to the drawings in detail, and initially to FIG. 1 thereof, it will be seen that a high-speed web sheeting and sheet delivery machine embodying the present invention, and there generally identified by the reference numeral 10, is intended to receive a continuous web W of flexible material, such as paper, cardboard, cloth, plastic, foil or the like, fed to the machine at a continuous high speed, and to continuously cut the web into successive sheets of uniform size which are delivered individually for further processing, for example, for arrangement in stacks which are delivered for collating into signatures or the like. The web W may be received by the machine 10 from a printing press or other machine by which the web has been previously processed or treated. Where the web W is received from a printing press and thus has repetitive printed patterns thereon which are to be registered with respect to the sheets cut from the web, the web is subjected to the corrective action of a suitable longitudinal register control unit (not shown) forming no part of the present invention and which generally corrects errors in longitudinal registration by either increasing or decreasing the length of the web between the machine 10 and the printing press or other machine by which the web has been previously processed.

The web W fed at a continuous high-speed to the machine 10 may also be longitudinally slit into a plurality of continuous ribbons which then pass side-by-side through the machine 10 and are simultaneously transversely cut into successive sheets, and it will be understood that, in the following detailed description, all references to the web W apply equally to the latter when it has been longitudinally slit into a plurality of ribbons.

The machine 10 generally comprises side frame members 11 between which there is mounted a rotary cutting mechanism 12 having associated therewith means for maintaining a predetermined tension in the web fed to the rotary cutting mechanism and means for delivering the successive sheets cut from the web.

Figure 3:
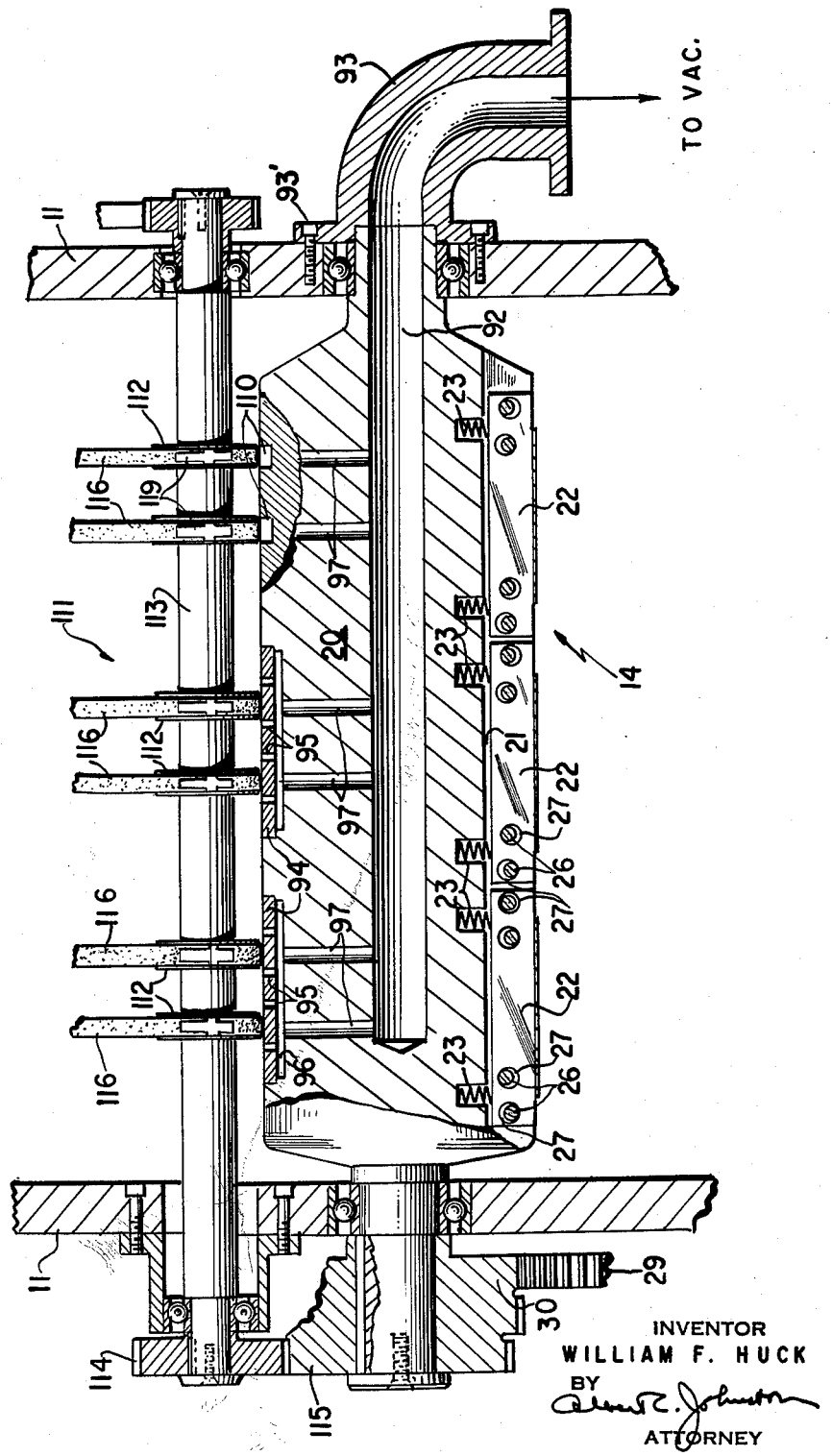
FIG. 3 is another transverse sectional view taken along the line 3—3 on FIG. 1.
Figure 4:
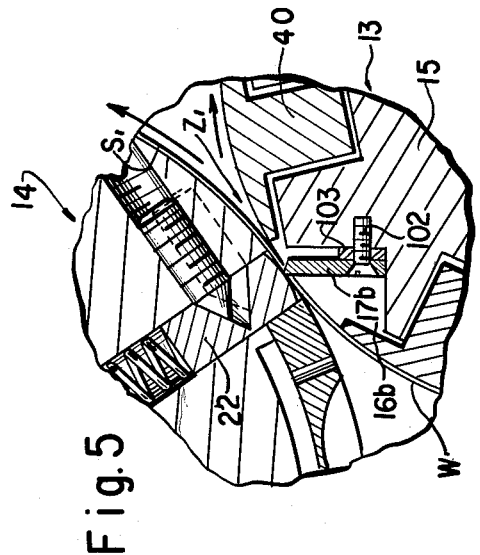
FIG. 4 is an enlarged fragmentary sectional view illustrating the details of the coacting cutting elements included in the rotary cutting means of the machine illustrated in FIG. 1.

The rotary cutting mechanism 12 generally includes first and second cylinders 13 and 14, respectively, which are journalled, at their ends, in suitable bearings carried by side frame members 11 (FIGS. 2 and 3) so as to be rotatable about parallel, horizontal axes which are spaced apart by a distance equal to substantially the sum of the radii of both cylinders so as to provide a zone of tangency $Z_1$ therebetween (FIGS. 1 and 4).

As shown particularly in FIGS. 2 and 4, the first cylinder 13, hereinafter referred to as the knife-carrying cylinder, includes a generally cylindrical body 15 having one or more axially extending recesses 16 in the surface thereof at equally circumferentially spaced apart locations. Each recess 16 receives a cutting blade or knife 17 which is held in the related recess by a wedge or clamping block 18 secured to body 15, as by screws 19. Although the cylinder 13 of the illustrated machine 10 is shown with three knives 17 thereon, it is to be understood that a larger or smaller number of knives may be carried by that cylinder depending upon the circumference of cylinder 13 and the length of the successive sections or sheets, to be cut from web W, which length is equal to the circumference of cylinder 13 divided by the number of knives 17 thereon.

The second or transfer cylinder 14 of rotary cutting mechanism 12 also includes a cylindrical body 20 (FIGS. 1, 3 and 4) having a plurality of axially extending recesses or slots 21 in its surface, which recesses or slots are equal in number to the recesses 16 in the body of cylinder 13 and are also equally spaced apart in the circumferential direction. The recesses or slots 21 accommodate elongated anvil members 22 which are urged radially outward, as by springs 23. The members 22 are radially positioned by set screws 24 which are received in offset tapped bores 25 formed in body 20 so as to open into each slot 21. The offset set screws 24 have conical points 26 which engage in conical sockets 27 formed in the related anvil members 22 and having greater base diameters than points 26 so that the latter can be extended more or less into the related sockets 27 for limiting the radially outward and inward movements of anvil members 22.

The knife-carrying cylinder 13 is suitably rotated in the clockwise direction, as viewed in FIG. 1, for example, through a suitably rotated drive gear 28 (FIG. 2) meshing with a gear 29 fixed on a trunnion extending from one end of cylindrical body 15, while the second or transfer cylinder 14 is rotated at the same angular speed as cylinder 13, but in the counterclockwise direction, as viewed on FIG. 1, for example, through a gear 30 fixed on a trunnion extending from an end of cylindrical body 20 and meshing with the previously mentioned gear 29.

Although the cylinders 13 and 14 are counter-rotated at the same angular speed, cylinder 14 is preferably dimensioned so as to have a circumference substantially greater than the effective circumference of knife-carrying cylinder 13, whereby the peripheral or circumferential speed of cylinder 14 is proportionately greater than that of cylinder 13. However, since cylinders 13 and 14 have the same numbers of knives 17 and anvil members 22 and are rotated at the same angular speed, gears 29 and 30, which are preferably of the anti-backlash type, can be brought into meshing engagement with each other so as to ensure that each knife 17 moves through the zone of tangency $Z_1$ between the cylinders simultaneously with a related one of the anvil members 22, as indicated on FIGS. 1 and 4.

Referring again to FIG. 1, it will be seen that the web W to be formed into successive sheets by the rotary cutting mechanism 12 passes downwardly toward knife-carrying cylinder 13 and is wrapped around the lower peripheral portion of the latter before reaching the zone of tangency $Z_1$ between cylinders 13 and 14, so that the web is advanced to the zone at the circumferential speed of cylinder 13. In order to ensure that the part of the web thus wrapped around the lower peripheral portion of cylinder 13 is positionally fixed with respect to the knife or knives 17, that part of the web wrapped around cylinder 13 is held tightly against the latter by a web pressing device 31 (FIGS. 1 and 2).

The device 31 for holding the web in non-slip engagement with the lower peripheral portion of cylinder 13 may include a plurality of belts 32 guided around pulleys 33 and 34 which are freely rotatable on shafts at fixed locations respectively in front and in back of cylinder 13 so that a flight 32a of each belt 32 between the related pulleys 33 and 34 is arcuately wrapped over web W on the lower peripheral portion of cylinder 13. The flight 32a of each belt 32 is pressed tightly against the web on cylinder 13 by tension applied to the related belt 32 through a tension pulley 35 rotatably journalled in arms 36 extending radially from an axle 37 journalled in side frame members 11. A radial arm 38 (FIG. 1) extends from one end of axle 37 and is connected to a spring 39 which is anchored to the adjacent side frame member 11 so as to urge axle 37 to turn in the direction for tensioning belts 32 through the tension pulleys 35.

Since the non-slip engagement of web W with a substantial peripheral portion of cylinder 13 ensures that there will be no change in the positional relationship between each knife 17 of cylinder 13 and the portion of the web overlying the same at zone $Z_1$, the length of each sheet cut from web W is accurately maintained equal to the circumferential distance along cylinder 13 between the successive blades or knives 17 carried by the latter.

The accurate maintenance of the uniform size of sheets cut from the web W by rotary cutting mechanism 12 further requires that the web fed to such mechanism be under a uniform, adjustably predetermined tension, notwithstanding the effects on the tension of changes in the environment or atmospheric conditions or of the corrective action of longitudinal register control means which may act on the web between the machine 10 and another machine, for example, a printing press, which previously processes the web.

In accordance with this invention, sensitive and accurate web tension control is achieved by constructing cylinder 13 of the rotary cutting means so as to have a variable effective circumference which is adjusted in accordance with the actual tension in the web in advance of cylinder 13 either to increase the length of the web wrapped around cylinder 13 in response to a decreasing web tension or to decrease the length of the web wrapped around cylinder 13 in response to an increasing web tension, thereby to maintain the web tension substantially at an adjustably predetermined value. The arrangement embodied in the machine 10 for thus maintaining an adjustably predetermined web tension embodies features of construction and operation similar to those disclosed in my co-pending application for United States Letters Patent, Serial No. 28,609, filed May 12, 1960, for "Rotary Perforator."

In the web tension control here shown, the surface of cylinder 13 between knives 17 carried by the latter is formed by bar elements 40 (FIGS. 1 and 2) slidably received in axially extending, radially opening slots 41 formed at circumferentially spaced apart locations in the surface of cylinder body 15. Each bar element 40 is of T-shaped cross-section so as to include a relatively wide flange projecting from slot 41 and having a suitably arcuate outer face which cooperates with the arcuate outer faces of the other bar elements 40 to define the peripheral surface of cylinder 13 between knives 17. As shown in FIG. 2, each bar element 40 is mounted within the related slot 41 by means of a pair of inclined leaf springs 42 which are secured, at their outer ends, to the related bar element 40 and, at their inner ends, to cylindrical body 15. By reason of the mounting of each bar element 40 in its related slot 41 through the inclined springs 42, each bar element is movable both radially and axially relative to cylindrical body 15. The springs 42 are arranged to urge the related bar element 40 both radially inward and axially in the direction toward the left, as viewed on FIG. 2.

The opposite ends of bar elements 40 extend loosely into undercut rings 43 and 44 provided on the opposite end portions of cylindrical body 15, and helical compression springs 45 act between each of the rings 43 and 44 and the related ends of bar elements 40 to further urge the latter radially inward. The ring 43 is fixed on cylindrical body 15, while the other ring 44 is axially movable relative to the body, as hereinafter described in detail, and is provided with a hooked edge 46 engageable in a similarly shaped notch 47 at the adjacent end of each bar element 40 so that the latter is constrained to follow the axial displacement of ring 44 toward the right, as viewed in FIG. 2.

Such axial displacement of ring 44 is effected by an actuating mechanism 48 that includes a shaft 50 axially slidable within an axial bore 52 opening at one end of cylindrical body 15 and carrying diametrically extending rods 54 which pass loosely through axially elongated radial passages 56 in body 15 and have their outer ends received in suitable sockets in ring 44. The outer end portion of shaft 50 carries an anti-friction bearing 58 on which there is mounted the hub of a radially extending arm 60 so that shaft 50 can rotate with body 15 of cylinder 13 independently of radial arm 60. A housing 62 extends around bearing 58 and is fixedly secured to the adjacent side frame member 11, and follower rollers 64 are mounted within housing 62 for rotation about radially extending axes and are engageable with a cam ring 66 suitably secured at the inside of arm 60 around the hub of the latter.

Figure 2:
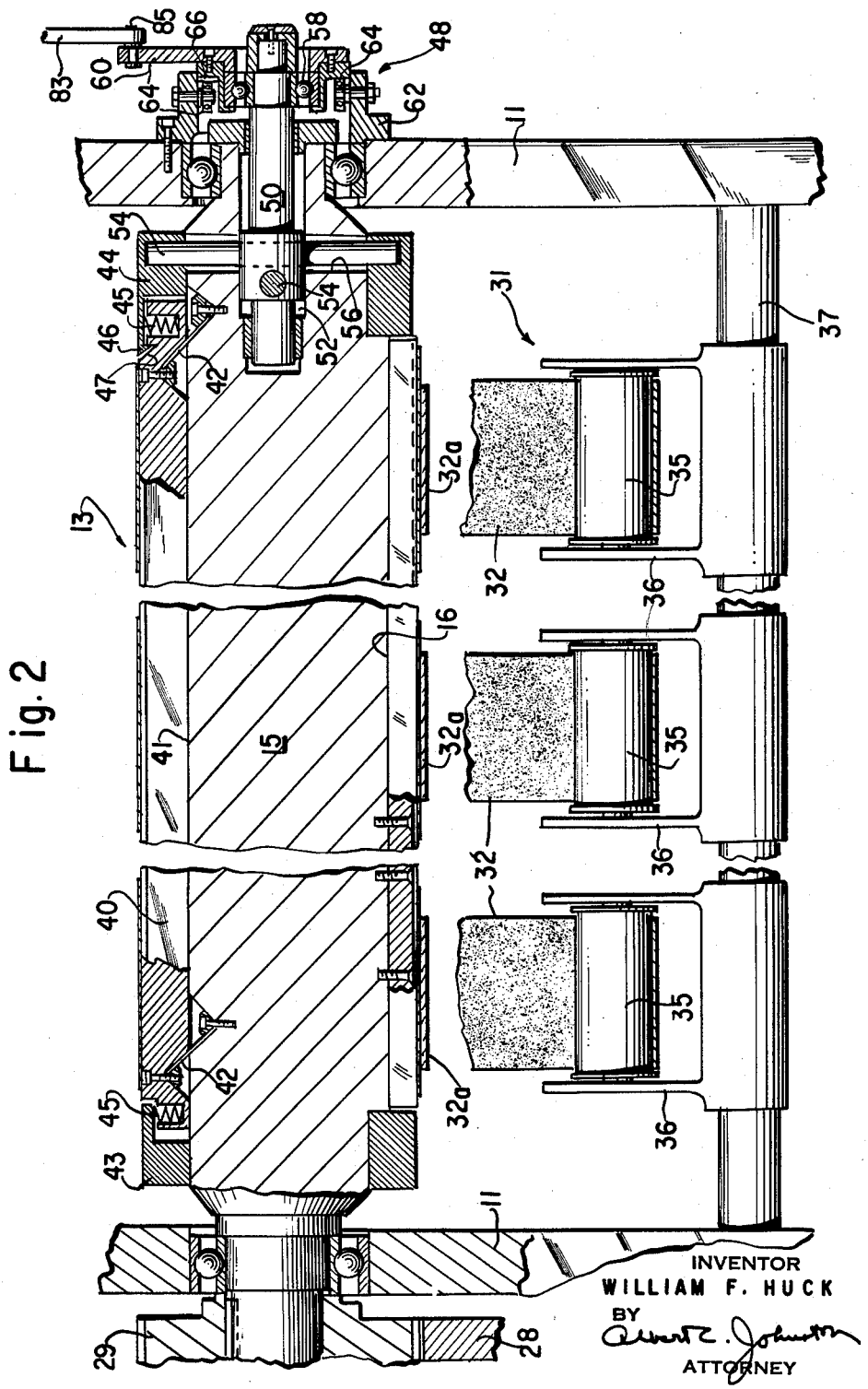
FIG. 2 is a transverse sectional view taken along the line 2—2 on FIG. 1, but on an enlarged scale.

Since springs 42 and 45 tend to urge bar elements 40 radially inward, and such radially inward movement of the bar elements has an axial component in the direction toward the left, as viewed in FIG. 2, by reason of the mounting of the bar elements on the inclined springs 42, it will be apparent that the springs 42 and 45 urge bar elements 40, ring 44, rods 54 and shaft 50, as a unit, axially toward the left, that is, in the direction tending to retract shaft 50 within cavity 52, and therefore urging cam ring 66 against follower rollers 64. Thus, angular displacement of arm 60 on bearing 58 is effective to either displace shaft 50, and hence bar elements 40 toward the right, as viewed on FIG. 2, or to permit the bar elements to be displaced toward the left by the action of springs 42 and 45, depending upon the direction of the angular displacement of arm 60. Further, it will be apparent that, when bar elements 40 are displaced toward the right, as viewed in FIG. 2, in the manner described above, the inclined mounting springs 42 for the bar elements provide a radially outward component of such motion to increase the effective circumference of cylinder 13, whereas displacement of bar elements 40 toward the left is accompanied by their radially inward movement to decrease the effective circumference of the cylinder.

In order to make the radially inward and outward movements of bar elements 40 responsive to changes in web tension from an adjustably predetermined value, the web W fed to the machine 10 passes under an idler roller 67 rotatable about a fixed axis, then around a floating roller 68, and then over an idler roller 69 rotatable about a fixed axis before travelling downwardly in a further part of the web path leading to cylinder 13. Thus, a loop formed in the web extending around roller 68 between idler rollers 67 and 69, and the tension in the web forming such loop acts on floating roller 68 to urge the latter toward the right, as viewed on FIG. 1. Floating roller 68 is rotatably journalled in arms 70 extending generally upward from a rockable shaft 71 which is carried, at its opposite ends, by side frame members 11. The force acting on floating roller 68 as a result of web tension is opposed by a tension spring 72 connected, at one end, as at 73, to one of the arms 70. In order to permit adjustment of the force exerted by spring 72, its other end is connected, as at 74, to a rockable arm 75 secured on a shaft 76 which also has secured thereto an arm 77 pivotally carrying a nut 78. An adjusting screw 79 rotatably carried by a bracket 80 on the adjacent side frame member 11 and having a knurled knob 81 at one end is threaded through the nut 78 so that rotation of knob 81 causes travel of nut 78 along screw 79 and rocking of arms 77 and 75 for varying the force exerted by spring 72 on arm 70.

Shaft 71 carrying arms 70 which support floating roller 68 also has a radial arm 82 secured thereto for rocking movement with arms 70, and the opposite ends of a link 83 are pivotally connected, as at 84 and 85, to arms 82 and 60, respectively, so that the rocking movements of arm 82 effect angular displacement of the arm 60 of actuating mechanism 48. A dashpot 86 is pivotally mounted, as at 87, on one of the side frame members 11 and has its piston rod 88 pivotally connected, as at 89, to the end of arm 82 so as to reduce the tendency of floating roller 68 to hunt during operation, and further to prevent serious damage to the actuating mechanism 48 in the event of a break in web W.

In the above described tension control mechanism, the forces exerted by the springs 42 and 45 on bar elements 40 and tending to move the latter radially inward balance the resultant of the tension in web W and the adjustable tension control force exerted by the spring 72. If the web tension falls below the desired value, as determined by the adjustment of the length of spring 72, the latter causes movement of floating roller 68 toward the left, as viewed on FIG. 1, and the resulting angular displacement of shaft 71 is transmitted through arm 82 and link 83 to arm 60 of actuating mechanism 48 so that cam 66 (FIG. 2) causes axial displacement of shaft 50 in the direction for effecting radially outward movement of bar elements 40, thereby increasing the circumferential length of web W wrapped on the lower peripheral portion of cylinder 13 and correspondingly increasing the tension in the web until the resultant of the web tension and the tension control force exerted by spring 72 is again balanced by the increased forces exerted by springs 42 and 45. Conversely, if the web tension increases beyond the desired value, the increased web tension causes displacement of floating roller 68 toward the right, as viewed on FIG. 1, and the corresponding angular displacement of arm 60 turns cam ring 66 to permit axial displacement of shaft 50 (FIG. 2) in the direction corresponding to radially inward movement of bar elements 40 by springs 42 and 45 and by tension of the web wrapped on cylinder 13, thereby to decrease the length of the web wrapped around the lower peripheral portion of cylinder 13 for correspondingly decreasing the tension in the web until the forces exerted by springs 42 and 45 again balance the resultant of the web tension and the control force exerted by spring 72.

An indicator or pointer 90 (FIG. 1) may further be secured on one end of shaft 71 to cooperate with a scale 91 on the adjacent side frame member 11 in indicating the above described changes in the position of floating roller 68.

It has been found that the above described tension control mechanism is extremely sensitive to any changes in web tension from an adjustably predetermined value and is operative to accurately maintain the desired web tension, thereby to further ensure that the portion of the web wrapped around cylinder 13 will not slip relative to the knives 17 of the latter so that the sizes of the sheets cut from web W will be accurately maintained, even during high-speed operation.

In the machine shown, the leading part of web W moved by knife-carrying cylinder 13 into the zone of tangency $Z_1$ of cylinders 13 and 14 is carried away from that zone on the surface of the cylinder 14. In order to achieve the foregoing, cylinder 14 is provided with means operative to hold to its surface the leading part of the web moved into the zone of tangency $Z_1$. Since cylinder 14 preferably has a circumferential speed greater than that of cylinder 13, the means for holding the leading part of web W to the surface of cylinder 14 permits slipping of the surface of cylinder 14 relative to the leading part of the web held thereagainst until such part of the web is severed from the succeeding portion of the web by the coaction of a knife 17 on cylinder 13 and an anvil member 22 on cylinder 14 at the zone $Z_1$.

More specifically, as shown in FIGS. 1 and 3, the cylindrical body 20 of cylinder 14 has an axial bore 92 opening, through a trunnion at one end of the cylindrical body, and there communicating with an elbow 93 (FIG. 3) which is secured, as by screws 94, to the adjacent side frame member 11 and which is suitably connected to a source of vacuum (not shown). The surface of cylinder 14 between the locations of anvil members 22 is defined by arcuate plates 94 with perforations or ports 95 therein which overlie annular cavities 96 communicating with the axial bore 92 through radial passages 97. Thus, suction is applied to the ports 95 to cause adherence to the surface of cylinder 14 of the leading part of the web advanced to zone $Z_1$ by cylinder 13.

Since cylinder 14 preferably has a circumferential speed greater than the circumferential speed of cylinder 13, and hence greater than the speed at which the web in non-slip engagement with the surface of cylinder 13 is advanced to zone $Z_1$, it will be apparent that the surface of cylinder 14 will slip relative to the leading part of the web held against that surface by the suction applied at ports 95 so long as that leading part of the web is joined to the following portion of the web wrapped around the lower peripheral portion of cylinder 13. However, when a knife 17 and an anvil member 22 move simultaneously through the zone of tangency $Z_1$, such knife and anvil member coact to transversely cut the web and thereby sever the leading part of the web held against the surface of cylinder 14 from the following portion of the web wrapped on cylinder 13, so that the severed leading part of the web forms a sheet $S_1$ (FIG. 1) of the desired length. As soon as the sheet $S_1$ is severed from the following portion of the web, the sheet $S_1$ is free to move at the circumferential speed of the surface of cylinder 14 against which it is held by the suction applied to the ports 95 covered by the sheet. Thus, the cut sheet $S_1$ is moved away from the zone $Z_1$ at the circumferential speed of cylinder 14, while the following portion of the web, which is then the leading part thereof, is advanced to the zone $Z_1$ and there transferred to the surface of cylinder 14 at the slower circumferential speed of the cylinder 13, with the result that each sheet $S_1$ is carried away from the zone $Z_1$ in spaced relation to the leading part of the web intended to form the succeeding sheet.

In order to ensure that the sheet $S_1$ immediately accelerates to the circumferential speed of cylinder 14 upon being severed from the following poriton of the web, the illustrated machine 10 further includes a roller 98 (FIG. 1) carried, at its opposite ends, by side frame members 11 for rotation about an axis parallel to the axis of rotation of cylinder 14, and being disposed adjacent the surface of the latter at a location substantially above the zone $Z_1$. Roller 98 has a segmental rubber flange 99 dimensioned for intermittent rolling contact with the sheet $S_1$ on the surface of cylinder 14. Roller 98 is suitably driven, for example, through a belt and pulley drive 100, so that the circumferential speed at the periphery of flange 99 is equal to the circumferential speed of cylinder 14. Further, flange 99 is angularly positioned on roller 98 so that, at the instant when a sheet $S_1$ is severed from the following portion of the web at the zone $Z_1$, the leading edge of the sheet is pinched or enters the nip between the surface of cylinder 14 and the periphery of flange 99 so as to be immediately accelerated from the circumferential speed of cylinder 13 up to the greater circumferential speed of cylinder 14.

The use of a cylinder 14 having a greater diameter than the cylinder 13, and hence a greater circumferential speed, not only results in the spacing apart of the successive sheets carried away from zone $Z_1$ on the surface of cylinder 14 so as to facilitate the delivery of the successive sheets, as hereinafter described in detail, but also improves the cutting action on the web at the zone $Z_1$. More specifically, due to the difference between the circumferential speeds of cylinders 14 and 13, each anvil member 22 of cylinder 14 engages the related knife 17 of cylinder 13 over a somewhat extended arc of contact, thereby enhancing the cutting action. Further, since the leading edge of the portion of the web forming the sheet $S_1$ is nipped between the surface of cylinder 14 and the flange 99 of roller 98 and thereby made to advance at the circumferential speed of cylinder 14 at the instant when a knife 17 and the related anvil member 22 coact to transversely cut the web, while the following portion of the web wrapped on cylinder 13 continues to move at the lower circumferential speed of the latter, the cutting action is accompanied by the simultaneous pulling apart of the sheet $S_1$ from the following portion of the web, thereby to ensure reliable separation of the successive sheets.

Figure 7:
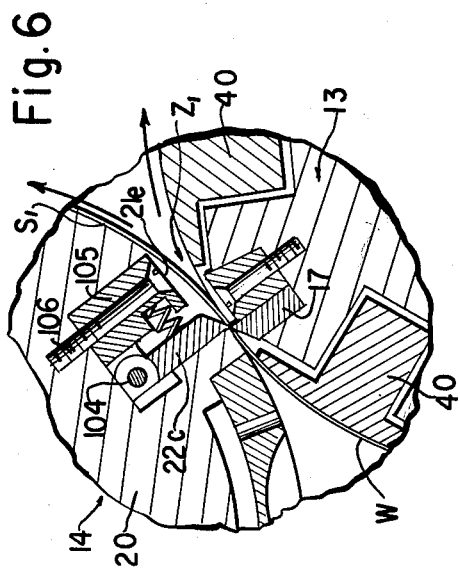

Referring now to FIGS. 7, 8 and 9, it will be seen that, in a modification of the rotary cutting mechanism described above, each anvil member 22a carried by cylinder 14 for cooperation with a related knife 17 carried by cylinder 13 is also formed with a cutting edge 101 (FIG. 8) which is disposed at a slight angle with respect to the axis of cylinder 14 so that one end of edge 101 slightly leads the other end of the cutting edge. Thus, as diagrammatically illustrated in FIG. 9, the difference between the circumferential speeds of the cylinders 13 and 14 causes contact of the cutting edge of knife 17 with the cutting edge 101 of anvil 22a at progressive points along the edge 101 as the knife 17 and anvil member 22a move through the zone $Z_1$. More specifically, when knife 17 is positioned relative to anvil member 22a as indicated at $a$, its cutting edge effects contact with the inclined cutting edge 101 at the point $a'$ adjacent the leading end of the latter. Since anvil member 22a moves at a higher speed than knife 17, the subsequent positions of the knife relative to the anvil member, as represented at $b$ and $c$, cause contact of the knife edge with the anvil cutting edge 101 at the points $b'$ and $c'$, respectively, which are progressively spaced laterally along inclined edge 101 from the leading end toward the trailing end of the latter. Thus, anvil member 22a having an inclined cutting edge 101 produces a shear cutting action on the web.

Figure 5:
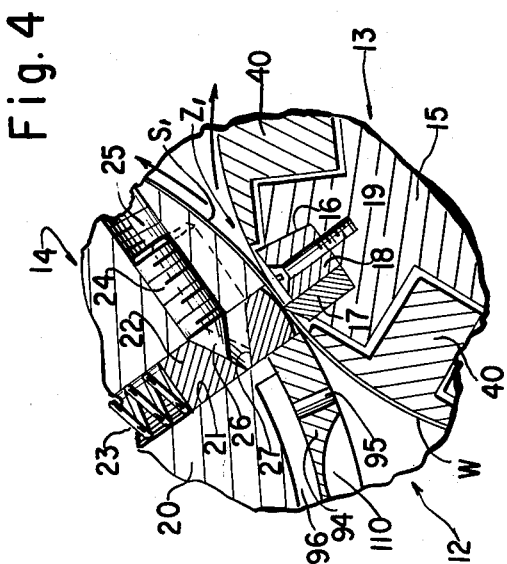

Referring now to FIG. 5, it will be seen that, in another modification of the machine embodying the invention, each knife 17b carried by cylinder 13 to coact with a related anvil member 22 of the cylinder 14 in transversely cutting the web at the zone $Z_1$ may be secured against a wall of the related recess 16b in cylindrical body 15 by means of screws 102 with a spacer 103 interposed between the base portion of the knife 17b and the adjacent wall surface of the recess so that the outer portion of the knife having the cutting edge thereon is free to deflect slightly upon contact with the related anvil member 22, thereby substantially decreasing the impact and shock loads during cutting and appreciably increasing the operating life of the cutting elements.

Figure 6:
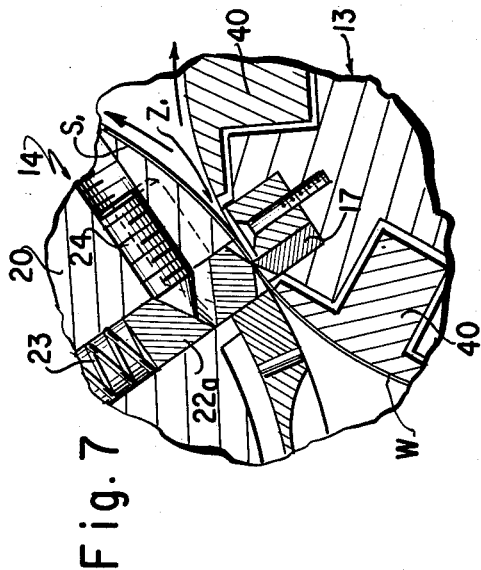
FIGS. 5, 6 and 7 are views similar to that of FIG. 4, but showing various modifications of the coacting cutting elements.

In the further modification illustrated in FIG. 6, each anvil member carried by cylinder 14 for cooperation with a knife 17 on cylinder 13 in transversely cutting the web is replaced by a knife 22c pivoted, as at 104, on a support 105 which is secured, as by screws 106, within the related axially extending recess 21c in the surface of body 20 of cylinder 14. Each blade or knife 22c is urged against a wall of its related recess 21c in the direction opposed to the rotation of cylinder 14 by springs 107 interposed between the blade and its support 105.

With the arrangement shown in FIG. 6, cylinders 13 and 14 must be rotated at the same circumferential speeds, and the cutting edges of the related knives 17 and 22c are made to overlap at the zone of tangency $Z_1$ to produce a shear cutting action. In order to facilitate the transverse cutting of the web by the related knives 17 and 22c, the cutting edge of each knife 22c may be inclined relative to the axis of cylinder 14, that is, have its opposite ends at different radial distances from the axis of the cylinder, so as to cooperate with the related knife 17 in progressively cutting across the web from one side to the other with a "scissor" action. Such a progressive cut proceeding from one side of the web to the other results in an undesirable progressive loss of tension across the web. However, this disadvantage may be overcome by forming the knife 22c, with a convex cutting edge, as at 108 on FIG. 10 so that the cut starts at the center of the web and proceeds outwardly toward the opposite edges of the latter, or by forming the knife $22_c'$ with a concave cutting edge, as at 109 on FIG. 11, in which case the cut starts at the opposite edges of the web and proceeds laterally toward the center thereof.

In the preferred embodiments of the present invention, that is, where cylinder 14 has a circumferential speed greater than that of cylinder 13, the resulting slippage of the surface of cylinder 14 relative to the leading part of the web held thereagainst by suction prior to the severance of that leading part of the web from the following portion of the web to form the separated sheet $S_1$ further ensures that the leading edge of each sheet $S_1$ carried by the surface of cylinder 14 will be spaced circumferentially from the anvil member 22 of cylinder 14 which previously coacted with a knife of cylinder 13 to form the cut along that leading edge. Further, as shown in FIGS. 1, 3 and 4, the surface of cylinder 14 is formed with recesses 110 at locations spaced circumferentially from anvil members 22 in the direction opposed to the rotation of cylinder 14 so that, following the slippage of the surface of cylinder 14 relative to the leading part of the web held thereagainst, the sheet $S_1$ formed from that leading part of the web and being carried on the surface of cylinder 14 has its leading edge in overlying relation to recesses 110 in the surface of cylinder 14, whereby grippers can conveniently enter such recesses for securely engaging the leading edge of each sheet in effecting the delivery of the latter from cylinder 14 even during high-speed operation.

In the illustrated machine 10, the removal of the successive sheets from the surface of cylinder 14 is effected by a delivery conveyor 111 (FIGS. 1 and 3) which is preferably of the type disclosed in my co-pending application for United States Letters Patent, Serial No. 58,052, filed September 23, 1960, for "Sheet Conveying Device." Delivery conveyor 111 generally includes pulleys 112 secured on a shaft 113 extending parallel to the axis of cylinder 14 and having its opposite ends rotatably supported in suitable bearings carried by side frame members 11. Shaft 113 is located so that the pulleys 112 thereon are substantially tangential to the surface of cylinder 14 at a delivery or transfer zone $Z_2$ which is substantially spaced along the circumference of cylinder 14 from the zone $Z_1$ in the direction of rotation of the cylinder. Shaft 113 is suitably driven, for example, by a gear 114 on one end thereof meshing with a gear 115 which turns with cylinder 14. Non-slip belts 116, for example, timing belts, run around pulleys 112 and are driven by the latter. The belts 116 also travel around idler pulleys 117 rotatable on a shaft 118 which is supported by the side frame members 11 and spaced horizontally from shaft 113 in the direction away from cylinder 14 so that belts 116 travel along generally horizontally upper and lower runs between the related pulleys 112 and 117.

The belts 116 of conveyor 111 carry spaced apart grippers 119 each of which is secured intermediate its ends to the related belt to lie flat against the latter when the belt moves along a straight run. As each gripper 119 moves with its belt around the related pulley 112, the gripper remains substantially tangential to the belt at its central portion, so that the trailing portion of the gripper is separated or spaced from the belt to form a cavity therebetween. The gears 114 and 115 which drive conveyor 111 from cylinder 14 preferably have their pitch diameters selected so that the speed of movement of the delivery conveyor is less than the circumferential speed of cylinder 14. Further, grippers 119 are located along the related belts 116 so that grippers in open condition, as described above, pass through transfer zone $Z_2$ simultaneously with recesses 110 of cylinder 14 and extend into the recesses to receive the leading edge of a sheet $S_2$ (FIG. 1) which overlies the recesses. Since the circumferential speed of the surface of cylinder 14 transporting the sheet $S_2$ is greater than the speed of movement of the grippers 119 of delivery conveyor 111, the leading edge of the sheet $S_2$ is moved positively into the cavity defined by the grippers 119 in their open condition at transfer zone $Z_2$.

As the grippers 119 move along the substantially straight lower runs of their related belts 116, the trailing end portions of the grippers again approach the related belts so as to grip the leading edge of the sheet $S_2$ therebetween, whereby the sheet is progressively peeled or separated from the surface of cylinder 14 and carried by conveyor 111 for delivery to a machine which further processes the sheets, for example, a stacking mechanism generally identified by the reference numeral 120 and which forms no part of the present invention. During such removal of a sheet from the surface of cylinder 14, the suction acting thereon through ports 95 ensures that the trailing end portion of that sheet is carried downwardly with the surface of cylinder 14 away from transfer zone $Z_2$, as in the case of the sheet indicated at $S_3$ on FIG. 1, thereby to avoid interference with the leading edge of the next sheet $S_2$ which is then approaching the transfer zone $Z_2$ at the circumferential speed of cylinder 14, which speed is greater than that at which conveyor 111 carries the sheet $S_3$ from cylinder 14 to stacking mechanism 120.

From the above it will be apparent that the machines provided according to the invention are continuously operative, at a high speed, to cut the web W supplied thereto into successive sections or sheets of accurately maintained uniform size, which sheets are then continuously delivered for stacking or other processing.

Although particular embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention, which is intended to be defined in the appended claims.

What is claimed is:

1. In a web cutting and delivery machine, the combination of
    first and second cylinders mounted so as to have a zone of tangency therebetween,
    means for counter-rotating said cylinders continuously at the same angular speed, said second cylinder having a greater diameter and proportionately a greater circumferential speed than said first cylinder,
    means guiding a web to be cut onto the surface of said first cylinder at a location on the latter spaced circumferentially a substantial distance from said zone of tangency and for holding the web wrapped against a substantial peripheral portion of said first cylinder in non-slip relation thereto for advancement thereby to said zone,
    coacting cutting elements on said first and second cylinders, respectively, and moving simultaneously through said zone to there cooperate in transversely cutting the web into successive cut sections, and
    means for holding to the surface of said second cylinder the new leading part of the web formed when each section is cut from the web in said zone of tangency, for carrying said leading part away from said zone on said second cylinder but at the lower speed of advancement of the web by said first cylinder until the next cut of the web is made in said zone, and for then accelerating the resulting cut section on said second cylinder to move it away from the new leading edge of the web, so that each cut section is carried away from said zone on said second cylinder in spaced relation to the following cut section.

2. In a web cutting and delivery machine, the combination as in claim 1, wherein said means for holding the web against said peripheral portion of the first cylinder comprises endless flexible belts having a main flight thereof wrapped upon said peripheral portion, relatively fixed rollers guiding said belts at the ends of said main flight, and floating roller means biased constantly against a return flight of said belts away from said first cylinder to keep the belts constantly tensioned against and moving with the surface of said first cylinder.

3. In a web cutting and delivery machine, the combination of first and second cylinders rotatably mounted so as to have a zone of tangency therebetween, means for counter-rotating said cylinders continuously at the same angular speed, said second cylinder having a greater diameter than said first cylinder so as to have a proportionately greater circumferential speed, means guiding a web to be cut onto the surface of said first cylinder at a location on the latter spaced circumferentially a substantial distance from said zone a tangency and for holding the web wrapped around a substantial peripheral portion of said first cylinder in non-slip relation to said surface for advancement to said zone at the circumferential speed of said first cylinder, a plurality of sets of coacting cutting elements respectively mounted on said first and second cylinders at equally angularly spaced apart locations thereon, the cutting elements of each set moving simultaneously, at the respective circumferential speeds of said first and second cylinders, through said zone and there mutually engaging over a substantial arc of contact to effect transverse cutting of the web into successive cut sections, and means on said second cylinder for holding to its surface the leading part of the web remaining when a section is cut from the web in said zone of tangency yet permitting slipping of said leading part relative to said second cylinder unit the next cut of the web is made in said zone, and for then accelerating the resulting cut section away from the new leading edge of the web, so that each cut section is carried away from said zone on said second cylinder in spaced relation to the following cut section.

4. In a web cutting and delivery machine, the combination as in claim 3;

wherein said means for holding the leading part of the web to said surface of the second cylinder includes means defining ports in said surface of the second cylinder between said cutting elements on the latter, and means for communicating said ports with a source of vacuum.

5. In a web cutting and delivery machine, the combination as in claim 3;

wherein said surface of the second cylinder has recesses therein each spaced circumferentially from a related one of said cutting elements in the direction opposed to the rotation of said second cylinder, said recesses being located so that each of successive sections carried by said second cylinder at the circumferential speed of the latter has its leading edge in overlying relation to a recess;

and further comprising delivery conveyor means driven in synchronism with said second cylinder and having grippers disposed to each enter one of said recesses of the second cylinder at a transfer zone spaced circumferentially from said zone of tangency and being operative to grip the leading edge of each of the successive sections at said transfer zone for removal of the gripped section from said second cylinder.

6. In a web cutting and delivery machine, the combination as in claim 5; wherein said means for holding the leading part of the web against said surface of the second cylinder includes means defining ports at dispersed locations in said surface of the second cylinder, and means for communicating said ports with a source of vacuum; and wherein said delivery conveyor means is driven at a slower speed than said circumferential speed of the second cylinder so that the latter moves the leading edge of a severed sheet into positive engagement with said grippers at the transfer zone, while vacuum applied to said ports continues to hold the trailing end portion of the sheet to said surface of the second cylinder for a period following engagement of the leading edge of the sheet by said grippers, thereby to carry the trailing end portion of the gripped sheet beyond said transfer zone for avoiding interference with the leading edge of the next sheet approaching said transfer zone on the surface of said second cylinder.

7. In a web cutting and delivery machine, the combination as in claim 3;

said accelerating means including means disposed adjacent the surface of the second cylinder to positively grip said leading part of the web and advance the same at a circumferential speed exceeding that of the first cylinder at the instant when the next cut of the web is made in said zone of tangency, whereby a pull is exerted on the leading part of the web to assist in accelerating it away from the following portion of the web.

8. In a web cutting and delivery machine, the combination as in claim 7; wherein said means to grip said leading part includes a roller rotatably mounted adjacent said second cylinder at a location spaced circumferentially from said zone of tangency by a distance substantially equal to the length of the sections to be cut from the web, said roller having at least one segmental elastic flange adapted for rolling contact with said surface of the second cylinder, and means for rotating said roller so that the peripheral speed of said flange is equal to said circumferential speed of the second cylinder.

9. In a web cutting and delivery machine, the combination of first and second cylinders rotatably mounted so as to have a zone of tangency therebetween, means for counter-rotating said cylinders continuously at the same angular speed, said second cylinder having a greater diameter than said first cylinder so as to have a proportionately greater circumferential speed, means guiding a web to be cut onto the surface of said first cylinder at a location on the latter spaced circumferentially a substantial distance from said zone of tangency, means for holding the web tightly to said surface between said location and said zone of tangency so that the web is wrapped around a substantial peripheral portion of said first cylinder in non-slip relation to said surface for advancement to said zone of tangency at the circumferential speed of said first cylinder, and coacting cross-cutting knives and anvil members on said first and second cylinders, respectively, at equally angularly spaced apart locations thereon so that, each knife moves through said zone simultaneously with a coacting anvil member, each of said anvil members having an anvil surface that extends both across the path of the web in said zone and arcuately in the direction of the circumference of said second cylinder so as to maintain a sliding cutting engagement with the coacting knife in said zone.

10. A machine according to claim 9, said anvil surface comprising a cutting edge that lies in a plane inclined to the axis of said second cylinder.

11. A machine according to claim 9, said anvil surface being convexly curved about an axis lying between it and the axis of said second cylinder in parallel relation to the latter.

12. A machine according to claim 9, said anvil surface comprising a cutting edge that extends across said path in an arc having its central portion leading in the direction of its rotation.

13. A machine according to claim 9, said anvil surface comprising a cutting edge that extends across said path in an arc having its ends leading in the direction of its rotation.

References Cited by the Examiner

UNITED STATES PATENTS

| | | | |
|---|---|---|---|
| 1,006,783 | 10/11 | Paquin | 83—341 |
| 1,331,727 | 2/20 | Seymour | 83—154 X |
| 1,825,250 | 9/31 | Rehak | 83—99 |
| 1,970,352 | 8/34 | Wohlrabe | 226—28 |
| 2,065,000 | 12/36 | Wood | 226—28 |
| 2,125,939 | 8/38 | Macfarren | 83—341 |
| 2,246,957 | 6/41 | Shields | 83—341 |
| 2,257,336 | 9/41 | Feurt | 83—345 |
| 2,610,850 | 9/52 | Huck | 271—79 |
| 2,958,365 | 11/60 | Molins et al. | 83—110 X |
| 3,008,364 | 11/61 | Stobb | 83—154 X |

ANDREW R. JUHASZ, *Primary Examiner.*

DONALD R. SCHRAN, *Examiner.*

UNITED STATES PATENT OFFICE
CERTIFICATE OF CORRECTION

Patent No. 3,174,372　　　　　　　　　　　　　　　　March 23, 1965

William F. Huck

It is hereby certified that error appears in the above numbered patent requiring correction and that the said Letters Patent should read as corrected below.

Column 6, line 42, for "cylinder" read -- cylindrical --; column 9, line 38, for "poriton" read -- portion --; column 13, line 17, for "a" read -- of --; line 35, for "unit" read -- until --.

Signed and sealed this 17th day of August 1965.

(SEAL)
Attest:

ERNEST W. SWIDER
Attesting Officer

EDWARD J. BRENNER
Commissioner of Patents